(12) United States Patent
Christner

(10) Patent No.: US 7,225,966 B2
(45) Date of Patent: Jun. 5, 2007

(54) WELDED JOINTS WITH POLYMER SEALANT

(75) Inventor: Brent Christner, Albuquerque, NM (US)

(73) Assignee: Eclipse Aviation Corporation, Albuquerque, NM (US)

(*) Notice: Subject to any disclaimer, the term of this patent is extended or adjusted under 35 U.S.C. 154(b) by 0 days.

(21) Appl. No.: 10/635,829

(22) Filed: Aug. 5, 2003

(65) Prior Publication Data

US 2004/0173662 A1    Sep. 9, 2004

Related U.S. Application Data

(60) Provisional application No. 60/402,505, filed on Aug. 7, 2002.

(51) Int. Cl.
*B23K 20/12* (2006.01)
*B23K 31/02* (2006.01)

(52) U.S. Cl. ................................. 228/112.1

(58) Field of Classification Search ............ 228/112.1, 228/2.1, 120; 156/73.5, 304.6, 273.3, 275.5
See application file for complete search history.

(56) References Cited

U.S. PATENT DOCUMENTS

| | | | |
|---|---|---|---|
| 4,144,110 A | | 3/1979 | Luc |
| 5,066,091 A | * | 11/1991 | Stoy et al. ............... 385/98 |
| 5,120,175 A | | 6/1992 | Arbegast et al. |
| 5,460,317 A | | 10/1995 | Thomas et al. |
| 5,609,294 A | * | 3/1997 | Lucas, Jr. ............... 238/9 |
| 5,611,479 A | | 3/1997 | Rosen |
| 5,769,306 A | | 6/1998 | Colligan |
| 5,813,592 A | | 9/1998 | Midling et al. |
| 5,972,524 A | * | 10/1999 | Childress ............... 428/615 |
| 6,045,028 A | | 4/2000 | Martin et al. ............ 228/112.1 |
| 6,051,325 A | | 4/2000 | Talwar et al. |
| 6,142,825 A | | 11/2000 | Shinchi |
| 6,168,066 B1 | | 1/2001 | Arbegast |
| 6,230,957 B1 | | 5/2001 | Arbegast et al. |
| 6,247,633 B1 | * | 6/2001 | White et al. ............ 228/112.1 |
| 6,328,261 B1 | | 12/2001 | Wollaston et al. |
| 6,460,752 B1 | | 10/2002 | Waldron et al. |

(Continued)

FOREIGN PATENT DOCUMENTS

DE    3815069 A   *  11/1989

(Continued)

OTHER PUBLICATIONS

RD268038A (abstract only), filed Aug. 1986, Research Discl., Newbould.*

(Continued)

*Primary Examiner*—Lynne R. Edmondson
(74) *Attorney, Agent, or Firm*—Irell & Manella LLP

(57) ABSTRACT

An assembly, such as an aircraft component, is formed with a weld joint by, for example, using friction stir welding, FSW, to form a lap joint between a stiffer and the interior surface of the skin of the component. A sealant layer, such as a monomer sealant/adhesive is applied to the surfaces to be joined, and is cured in place by the elevated temperatures of the welding process to form an elastomeric fay surface sealing, such as a fluoroelastomeric coating, to protect the component from corrosion at the welds. Additional heat for curing may be applied by laser or induction heating or the like.

24 Claims, 1 Drawing Sheet

U.S. PATENT DOCUMENTS

| | | |
|---|---|---|
| 6,536,651 B2 | 3/2003 | Ezumi et al. |
| 6,543,670 B2 | 4/2003 | Mahoney |
| 6,543,671 B2 | 4/2003 | Hatten et al. |
| 6,582,539 B2 | 6/2003 | Iwanczyk et al. |
| 6,604,667 B2 * | 8/2003 | Schilling et al. ............. 228/2.1 |
| 6,686,052 B2 * | 2/2004 | Jogan et al. ............. 428/472.2 |
| 6,759,449 B2 * | 7/2004 | Kimura et al. ............. 523/118 |
| 6,779,657 B2 * | 8/2004 | Mainwaring et al. ....... 206/229 |
| 6,779,707 B2 | 8/2004 | Dracup et al. |
| 2002/0047037 A1 | 4/2002 | Shinoda et al. |
| 2002/0162876 A1 | 11/2002 | Aota et al. |
| 2003/0042291 A1 | 3/2003 | Mahoney |
| 2003/0042292 A1 | 3/2003 | Hatten et al. |
| 2003/0085257 A1 | 5/2003 | James et al. |
| 2003/0116609 A1 | 6/2003 | Dracup et al. |
| 2003/0131932 A1 * | 7/2003 | Hoult et al. ............. 156/272.8 |
| 2003/0141343 A1 | 7/2003 | Murakami |
| 2004/0050907 A1 | 3/2004 | Dracup et al. |

FOREIGN PATENT DOCUMENTS

| | | |
|---|---|---|
| DE | 3815069 A1 | 11/1989 |
| GB | 2 224 683 A | 5/1990 |
| JP | 02197385 | 8/1990 |
| JP | 06134395 | 5/1994 |
| JP | 07164172 | 6/1995 |
| JP | 08109359 | 4/1996 |

OTHER PUBLICATIONS

Greenberg, Makover and Munitz, "Laser-Assisted Friction Stir Welding", Welding Journal, Feb. 2002, p. 46-48.

* cited by examiner

WELDED JOINTS WITH POLYMER SEALANT

RELATED APPLICATIONS

This application claims the priority of provisional application 60/402,505 filed Aug. 7, 2002.

BACKGROUND OF THE INVENTION

1. Field of the Invention

This invention relates to surface sealants for welded joints in general, and in particular, relates to polymer fay surface sealants for friction stir welding (FSW) joints used in aircraft construction.

2. Background of the Invention

Welded joints, such as lap joints, are used to join metal parts. Lap joints are used to join overlapping surfaces using one or more welds at the overlap of the materials. The surfaces of each piece of joined metal adjacent the fasteners or welds that are mated by the lap joint, called "fay" surfaces, are often not fully bonded by the weld or other fasteners and are often protected from corrosion by conventional fay surface sealants, such a polysulfide or polythioether, applied to the mating surfaces prior to joining. Such fay surface sealants may also be used to reduce mechanical and fatigue problems resulting from rubbing between the fay surfaces, vibration and the like.

Fay surface sealants are used in welding to prevent or reduce corrosion in large part by reducing moisture which may be trapped between the fay surfaces and/or brought in by capillary action. Conventional fay surface sealants may degrade the properties of the weld and are often degraded by the heat and mechanical activities involved in the welding and working of the materials as well as by vibration during use. Corrosion of fay surfaces within welds is often very difficult to detect by inspection.

Welding techniques typically use elevated temperatures to bond metals and metal alloys. Friction stir welding (FSW) is a welding technique in which the shoulder of a rotating tool is applied to the materials to be joined to heat and soften the materials by friction. The tool includes a rotating pin which penetrates the joint and stirs the materials together. Solid state joints are produced thereby without the addition of filler or the use of shielding gases. Friction stir welding is advantageously used in aircraft construction, for example, to weld a stringer or other support to the surface of the aircraft skin. Conventional FSW welding processes apply a zone of corrosion resistant material to cover the welded joint during and after welding as a fay surface sealant. An example of this technique is disclosed in U.S. Pat. No. 6,045,028, Martin et al. Corrosion of fay surfaces within a FSW weld in an aircraft is a very dangerous condition because of the reduction in strength of the aircraft structure, and it is very difficult to detect by inspection.

What is needed is a new fay surface sealant technique for producing FSW welded components with improved corrosion resistance for use, for example, in the production of airplanes and parts of airplanes.

SUMMARY OF THE INVENTION

In a first aspect, a method of welding includes positioning sealant between surfaces to be welded together and welding at least portions of the surfaces together to cure the sealant there between.

In another aspect, a welded structure includes a first member, a second member welded to the first member, and a fay surface sealant between the first and second member cured by the welding.

DETAILED DESCRIPTION OF A PREFERRED EMBODIMENT(S)

Figure 1:
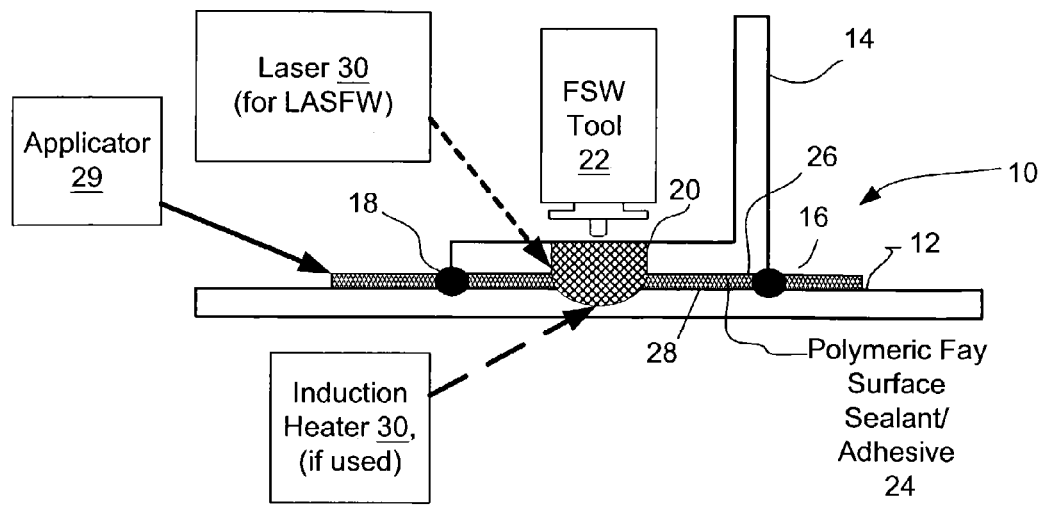
FIG. 1 is a cross sectional side view of a portion of an aircraft or similar structure including a lap joint between metal surfaces, showing typical locations of FSW welding joint lines, with a polymeric fay surface sealant for improved corrosion resistance.

Referring now to FIG. 1, a cross sectional side view of a portion of an aircraft or similar structure is shown including lap joint 10 between an aluminum, steel, titanium or alloy surface 12, such as an aircraft wing or body skin, with a stringer, such as an "L" shaped aluminum, steel, titanium or alloy support member 14. The lap joint is formed by using FSW or other known welding techniques at one or more of the welding locations generally indicated as FSW welding joint lines 16, 18 or 20. These joint lines are perpendicular to the plane of the drawing, and are formed by rotational of FSW welding tool 22 against support member 14 and/or surface 12. The rotation of tool 22 causes friction to heat and soften the materials to be joined, and mechanical mixing of the plasticised materials to form the joint. The elevated temperatures from this process may polymerize a sealant and/or adhesive monomer layer which, when cured, forms a corrosion protection layer, fay surface sealant layer 24.

The monomer layer preferably has characteristics suitable for the FSW welding process as well as suitable for the intended use of the jointed assembly. For example, the monomeric layer should be easy to apply to the critical area, and cured but not substantially damaged by the elevated temperatures produced by the welding. When cured, sealant layer 24 should provide corrosion resistance for the fay surfaces of the joint by, for example, resisting the intrusion of moisture by capillary action. A particularly useful fay surface sealant material for sealant layer 24, is formed by the application of a layer which when cured forms a fluoroelastomeric polymer to create a protective corrosion shield between the adjacent fay surfaces 26 and 28 of support member 14 and surface 12, respectively. It may be desirable to extend the coverage of sealant layer 24 beyond fay surfaces 26 and 28 in many applications.

Lap joint 10 is formed by the following process. The surfaces of 12 and 14 are prepared normally for FSW welding, thereafter, sealant layer 24 is prepared for application to the surfaces to be welded. One particularly useful polymeric fay surface sealant may be formed by use of a fluoroelastomer adhesive PLV 2100 available from Pelseal Technologies, LLC of Newtown, Pa. PLV 2100 is a 2 part adhesive which may be mixed in the ratio of 25–27 parts by weight of PLV 2100 base material to one part by weight of Accelerator #4, which is added to the based material and mixed thoroughly for about 5 minutes. For spray application, the mixed coating may then be thinned by adding methylisobutylketone (MIBK) or methylethylketone (MEK) in a 1:1 ratio by weight. It is desirable to avoid introducing substantial amounts of air into the mixture and it may be desirable to off-gas the mixture for 10 minutes prior to the application. Other materials shown to be suitable include Pelseal PLV 6032 and Thermodyne THP-2000.

Additional surface treatments may also be used with the process of the present disclosure. If device components are aluminum or aluminum alloy and increased joint corrosion resistance is desired, a conventional chemical conversion coating may be applied on at least the surfaces to be welded before application of the surface sealant.

The mixture may be applied to surface 26 of stiffener 14, and/or to surface 28 of skin 12, by using a hard rubber roller, brush, or preferably an HPLV sprayer as an applicator 29. An appropriate adhesive wet film thickness for layer 24 may be in the order of up to about 0.0005 to 0.0100 inches, preferably from 0.001 to 0.005 inches, to avoid problems such as causing FSW tool 22 to dive during the welding process, potentially creating an unacceptable weld. After the mixture is applied, surface 26 of support member 14 may then be clamped, preferably within about 20 minutes, to surface 28 of skin surface 12. If the clamping is not accomplished within 20 minutes, it may be desirable to rewet the surface by spraying with a fine mist of MIBK or MEK for up to about 1 hour after coating. Thereafter, the application of a new coating may be desirable if clamping has not been accomplished.

The PLV 2100 fluoroelastomer adhesive will cure at a temperature of about 75° F.±10° F. in approximately 24 hours. The application of rotating FSW tool 22 to form FSW welding joint lines 16, 18 and/or 24 serves to create the elevated temperatures necessary to cause the polymeric sealant adhesive to cure more quickly. In addition to the heat generated by the friction of the rotating contact between FSW tool 22 and weld points line 16, 18 or 20, additional heat may be provided to reduce cure time prior to or as part of the FSW welding process by the use of laser 30, in a process known as laser-assisted FSW (LAFSW) or by use of a heater, such as induction heater 32. After FSW welding to form joint 10 with polymeric fay surface sealant layer 24, the sealant may be sufficiently cured to permit other work, such as priming, on adjacent non-welded surfaces within the order of about 4 hours.

Figure 2:
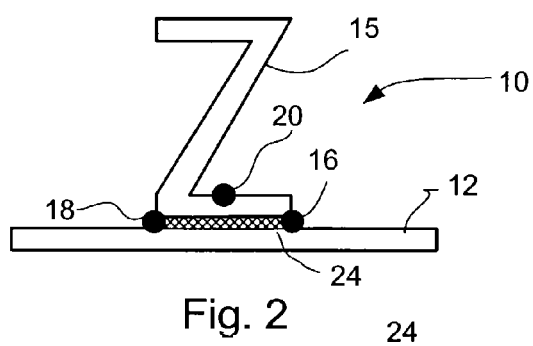
FIG. 2 is a cross sectional side view of the structure of FIG. 1 showing an alternate stiffener welded to a surface and protected with a polymeric fay surface sealant.
Figure 3:
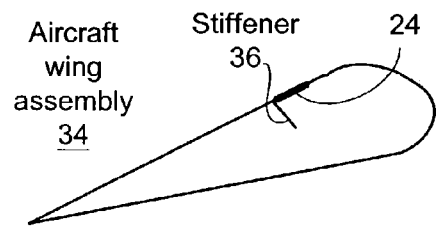
FIG. 3 is a cross sectional view of an aircraft wing and a representative stiffener with a polymeric fay surface sealant.
Figure 4:
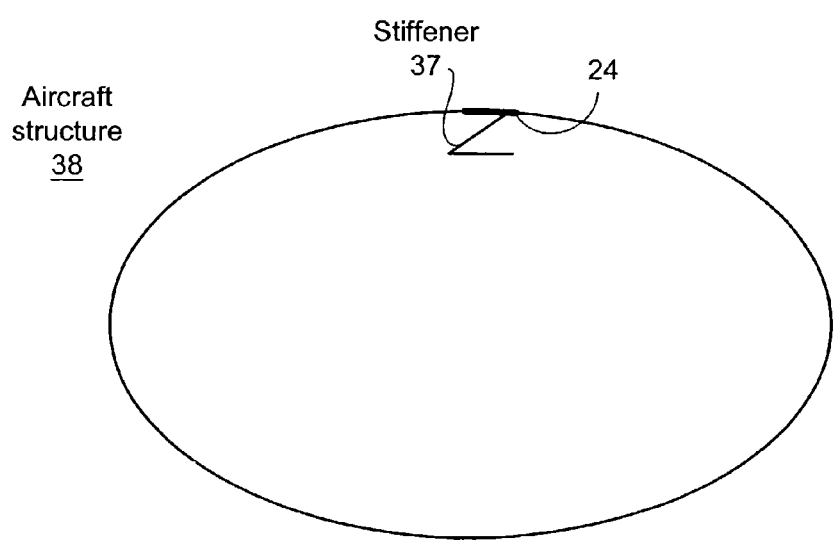
FIG. 4 is a cross sectional view of generic aircraft structure and a representative stiffener with a polymeric fay surface sealant.

Referring now to FIGS. 2, 3 and 4, there are many different types of stiffeners and surfaces to be joined that may be improved by the use of a sealant cured by the welding process. In FIG. 2, "Z" shaped stiffener 15 may be welded, by FSW or similar processes by lap joint or other known welding technique, to surface 12 at joints 16, 18 or 20 by the application of a suitable adhesive or sealant which is cured to form fay surface sealant 24.

Referring now to FIG. 3, a cross section of aircraft wing assembly 34 is shown in which stiffener 36 is joined to an appropriate surface by a welding process which cures a sealant layer to form an appropriate polymerized fay surface sealant 24.

Referring now to FIG. 4, a cross section of generic aircraft structure 38 is shown in which Z shaped stiffener 37 is joined to an appropriate surface by a welding process which cures a sealant layer to form an appropriate polymerized fay surface sealant 24.

Although PLV 2100 fluoroelastomer adhesive was used as an example of a suitable material to be applied to form fay surface sealant layer 24, other polymers cured but not damaged by the heat of the welding process to form a layer having appropriate corrosion resistant properties may be used. Fluoroelastomers are particularly useful for this purposes and include Viton branded materials from Dupont/Dow.

Although FSW welding techniques are particularly useful for producing weld joints which can be protected by fay sealants cured by the welding process, other welding techniques may be used. Similarly, in addition to lap joints, fillets and any other joint which may produce a fay or unbonded surface area, may be protected by fay sealants cured by the welding process. The use of fay surface sealants cured at least in part by the welding process is particularly useful in the construction of aircraft and aircraft sub-assemblies, many other assemblies may benefit from the use of heat cured fay surface sealants.

What is claimed is:

1. A method of welding comprising:
   positioning a monomer between surfaces to be welded together; and
   friction stir welding at least portions of the surfaces through the monomer to form a welded joint and to form a corrosion barrier sealant resisting the intrusion of moisture by capillary action adjacent the welded joint between the surfaces by at least partially polymerizing the monomer.

2. The invention of claim 1 further comprising:
   selecting a monomer through which a welded joint can be formed by friction stir welding without substantial degradation of the corrosion barrier sealant.

3. A method of welding comprising:
   selecting an elastomeric monomer through which a welded joint can be formed by friction stir welding without substantial degradation of the welded joint;
   positioning the elastomeric monomer which is at least partially cured without substantial damage by temperatures produced during friction stir welding between surfaces to be welded together; and
   friction stir welding at least portions of the surfaces through the monomer to form a welded joint and to form a corrosion barrier sealant adjacent the welded joint between the surfaces by at least partially curing the monomer.

4. A method of welding comprising:
   positioning a monomer, which is at least partially cured without substantial damage by temperatures produced during friction stir welding between surfaces to be welded together;
   partially curing the monomer before welding; and
   friction stir welding at least portions of the surfaces through the monomer to form a welded joint and to form a sealant adjacent the welded joint between the surfaces by at least partially curing the monomer.

5. The invention of claim 4 wherein welding further comprises:
   completing the curing of the monomer.

6. The invention of claims 1 or 2 wherein positioning the monomer further comprises:
   applying an elastomeric monomer.

7. A method of welding comprising:
   applying an adhesive monomer, which is at least partially cured without substantial damage by temperatures produced during friction stir welding, between surfaces to be welded together;
   partially curing the monomer before welding; and
   friction stir welding at least portions of the surfaces through the monomer to form a welded joint and to form a sealant adjacent the welded joint between the surfaces by at least partially curing the monomer.

8. A method of welding comprising:

positioning a monomer which is at least partially cured without substantial damage by temperatures produced during friction stir welding between surfaces to be welded together; and friction stir welding at least portions of the surfaces through the monomer to form a welded joint and to form a corrosion barrier sealant adjacent the welded joint between the surfaces by at least partially curing the monomer by at least partially polymerizing the monomer.

9. The invention of claims 1 or 2 further comprising:

applying additional heat to polymerize the monomer.

10. A method of welding comprising:

positioning a monomer, which is at least partially cured without substantial damage by temperatures produced during friction stir welding, between surfaces to be welded together;

applying heat in the form of laser energy to cure the monomer; and friction stir welding at least portions of the surfaces through the monomer to form a welded joint and to form a sealant adjacent the welded joint between the surfaces by at least partially curing the monomer.

11. The invention of claims 1 or 2 wherein welding further comprises:

forming a lap joint.

12. A method of welding comprising:

applying an elastomeric monomer, which is at least partially cured without substantial damage by temperatures produced during friction stir welding, between surfaces to be welded together; and friction stir welding at least portions of the surfaces through the monomer to form a welded joint and to form a corrosion barrier sealant adjacent the welded joint between the surfaces by at least partially curing the monomer.

13. The invention of claims 12 or 3 wherein positioning a monomer further comprises:

applying a fluoroelastomeric monomer.

14. A method of welding comprising:

selecting a monomer through which a welded joint can be formed by friction stir welding without substantial degradation of the welded joint;

positioning the monomer, which is at least partially cured without substantial damage by temperatures produced during friction stir welding, between surfaces to be welded together;

partially curing the monomer before welding; and friction stir welding at least portions of the surfaces through the monomer to form a welded joint and to form a sealant adjacent the welded joint between the surfaces by at least partially curing the monomer.

15. The invention of claim 14 wherein welding further comprises:

completing the curing of the monomer.

16. A method of welding comprising:

selecting an adhesive monomer through which a welded joint can be formed by friction stir welding without substantial degradation of the welded joint;

applying the monomer, which is at least partially cured without substantial damage by temperatures produced during friction stir welding, between surfaces to be welded together;

partially curing the monomer before welding; and friction stir welding at least portions of the surfaces through the monomer to form a welded joint and to form a sealant adjacent the welded joint between the surfaces by at least partially curing the monomer.

17. A method of welding comprising:

selecting an adhesive monomer through which a welded joint can be formed by friction stir welding without substantial degradation of the welded joint;

positioning the monomer, which is at least partially cured without substantial damage by temperatures produced during friction stir welding, between surfaces to be welded together;

applying heat in the form of laser energy to core the monomer; and friction stir welding at least portions of the surfaces through the monomer to form a welded joint and to form a sealant adjacent the welded joint between the surfaces by at least partially curing the monomer.

18. A method of welding comprising:

selecting a monomer which forms a corrosion barrier when cured;

positioning the monomer between surfaces to be welded together; and polymerizing the monomer by friction stir welding at least portions of the surfaces through the monomer to form a welded joint surrounded by a moisture resistant corrosion barrier sealant between the surfaces.

19. A method of welding comprising:

selecting a monomer which forms a corrosion barrier when cured;

positioning the monomer between surfaces to be welded together;

at least partially curing the monomer before welding; and curing the monomer by friction stir welding at least portions of the surfaces through the monomer to form a welded joint surrounded by a corrosion barrier sealant between the surfaces.

20. The invention of claim 19 wherein the monomer is an adhesive monomer.

21. A method of welding comprising:

selecting a monomer through winch a welded joint can be formed by friction stir welding without substantial degradation of the welded joint;

positioning the monomer which is at least partially cured without substantial damage by temperatures produced during friction stir welding between surfaces to be welded together; and friction stir welding at least portions of the surfaces through the monomer to form a welded joint and to form a corrosion barrier sealant adjacent the welded joint between the surfaces by at least partially polymerizing the monomer.

22. The invention of claims 4, 7, 10, 12, 14, 16, 17, 19 or 3 wherein curing the monomer further comprises:

polymerizing the monomer.

23. The invention of claim 22 wherein the monomer is an elastomeric monomer.

24. The invention of claim 22 wherein the monomer is a fluroelastomeric monomer.

* * * * *